United States Patent
Nguyen et al.

(10) Patent No.: US 9,659,372 B2
(45) Date of Patent: May 23, 2017

(54) VIDEO DISPARITY ESTIMATE SPACE-TIME REFINEMENT METHOD AND CODEC

(71) Applicant: The Regents of the University of California, Oakland, CA (US)

(72) Inventors: Truong Nguyen, San Diego, CA (US); Ho Chan, La Jolla, CA (US); Ramsin Khoshabeh, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 36 days.

(21) Appl. No.: 14/389,873

(22) PCT Filed: May 14, 2013

(86) PCT No.: PCT/US2013/040875
§ 371 (c)(1),
(2) Date: Oct. 1, 2014

(87) PCT Pub. No.: WO2013/173282
PCT Pub. Date: Nov. 21, 2013

(65) Prior Publication Data
US 2015/0063682 A1 Mar. 5, 2015

Related U.S. Application Data

(60) Provisional application No. 61/648,171, filed on May 17, 2012.

(51) Int. Cl.
*G06K 9/00* (2006.01)
*H04N 13/04* (2006.01)
*G06T 7/00* (2017.01)
*H04N 13/00* (2006.01)
*H04N 13/02* (2006.01)

(52) U.S. Cl.
CPC ....... *G06T 7/0022* (2013.01); *H04N 13/0048* (2013.01); *H04N 13/025* (2013.01); *H04N 13/0488* (2013.01); *G06T 2207/10021* (2013.01); *H04N 2013/0081* (2013.01)

(58) Field of Classification Search
USPC ................................. 382/154, 103; 348/51
See application file for complete search history.

(56) References Cited

U.S. PATENT DOCUMENTS 8,737,723 B1 * 5/2014 Kwatra ................ G06T 7/0075
345/419
2005/0185048 A1 8/2005 Ha
(Continued)

OTHER PUBLICATIONS

Khoshabeh et al, Spatio-temporal consistency in video disparity estimation, 7/12/2-11, IEEE, pp. 885-888.*
(Continued)

*Primary Examiner* — Kathleen Y Dulaney
(74) *Attorney, Agent, or Firm* — Greer, Burns & Crain, Ltd.; Steven P. Fallon

(57) ABSTRACT

A method for disparity estimation of stereo video data receives a sequence of frames of stereo video data. Image-based disparity estimation is initially conducted on a frame-by-frame basis to produce initial disparity estimates. A plurality of initial disparity estimates is grouped into a space-time volume. Disparity error is reduced in the space-time volume to refine the initial disparity estimates.

13 Claims, 1 Drawing Sheet

(56) References Cited

U.S. PATENT DOCUMENTS

| | | | |
|---|---|---|---|
| 2011/0012994 A1 | 1/2011 | Park | |
| 2013/0136299 A1* | 5/2013 | Kim | G06T 7/2006 382/103 |
| 2013/0194386 A1* | 8/2013 | Leontaris | H04N 13/0048 348/43 |
| 2014/0270485 A1* | 9/2014 | Kauff | G06T 5/002 382/154 |
| 2015/0085085 A1* | 3/2015 | Liu | G06T 7/0075 348/51 |

OTHER PUBLICATIONS

An, P., et al., "Theory and Experiment Analysis of Disparity for Stereoscopic Image Pairs", Intelligent Multimedia, Video and Speech Processing, 2001. Proceedings of 2001 International Symposium on, May 2001, pp. 68-71.

Bleyer, M., et al. "Temporally Consistent Disparity Maps from Uncalibrated Stereo Videos", in Proceedings of the 6th International Symposium on Image and Signal Processing (2009), pp. 383-387.

Boykov, et al. "Fast Approximate Energy Minimization via Graph Cuts," IEEE Transactions on Pattern Analysis and Machine Intelligence, vol. 23, No. 11, (Feb. 2004), pp. 1222-1239.

Chan, Stanley, H., et al. "An Augmented Lagrangian Method for Total Variation Video Restoration", IEEE Transactions on Image Processing, vol. 20, No. 11, Nov. 2011, pp. 3097-3111.

Eckstein, J., et al. "On the Douglas-Rachford splitting method and the proximal point algorithm for maximal monotone operators", Mathematical Programming, 55 (1992), pp. 293-318.

Felzenswalb, P., et al. "Efficient Belief Propagation for Early Vision", Computer Vision and Pattern Recognition, 2004. CVPR 2004. Proceedings of the 2004 IEEE Computer Society Conference on (vol. 1 ), Jun. 2004, pp. 261-268.

Hirschmuller, et al., "Evaluation of cost functions for stereo matching", Computer Vision and Pattern Recognition, 2007, CVPR 2007, IEEE Conference, (2007), 8 pages.

Huguet, F., et al., "A Variational Method for Scene Flow Estimation from Stereo Sequences" Computer Vision, 2007. ICCV 2007. IEEE 11th International Conference on, Oct. 2007, pp. 1-7.

Kolmogorov, V., et al., "Computing Visual Correspondence with Occlusions via Graph Cuts", Computer Vision, 2001. ICCV 2001. Proceedings. Eighth IEEE International Conference on (vol. 2 ), Jul. 2001, pp. 508-515.

Mobile 3DTV, "Mobile 3DTV content delivery optimization over DVB-H system", online at: http://sp.cs.tut.fi/mobile3dtv/technology/, 3 pages.

Napalantidis, L., et al. "Dense Disparity Estimation Using a Hierarchical Matching Technique from Uncalibrated Stereo Vision", Imaging Systems and Techniques, 2009. IST '09. IEEE International Workshop on, May 2009, pp. 427-431.

Richardt, C., et al., "Real-time Spatiotemporal Stereo Matching Using the Dual-Cross-Bilateral Grid", Computer Vision—ECCV 2010, Lecture Notes in Computer Science vol. 6313, (2010), pp. 510-523.

Scharstein, D., et al. "A Taxonomy and Evaluation of Dense Two-Frame Stereo Correspondence Algorithms", International Journal of Computer Vision, vol. 47, No. 1, Apr. 2002, pp. 7-42.

Williams, O., et al., "Estimating Disparity and Occlusions in Stereo Video Sequences," Computer Vision and Pattern Recognition Proceedings (2005), 8 pages.

Yang, J., et al., "An efficient TVL1 algorithm for deblurring multichannel images corrupted by impulsive noise," SIAM Journal on Scientific Computing, vol. 31, (2009), pp. 974-988.

Yang, Qingxiong, et al., "Real-time Global Stereo Matching using Hierarchical Belief Propagation", Feb. 21, 2007 [online] [retrieved on Aug. 22, 2013] Retrieved from the Internet: <URL:http://www.macs.hw.ac.uk/bmvc2006/papers/324.pdf>, 10 pages.

Yoon, K.J., et al. "Locally Adaptive Support-Weight Approach for Visual Correspondence Search", Computer Vision and Pattern Recognition, 2005. CVPR 2005. IEEE Computer Society Conference on (vol. 2 ), Jun. 2005, pp. 924-931.

Zhang, G., et al., "Consistent Depth Maps Recovery from a Video Sequence", Pattern Analysis and Machine Intelligence, IEEE Transactions on, vol. 31, Issue 6, Jun. 2009, pp. 974-988.

Zhu, J., et al., "Fusion of Time-of-Flight Depth and Stereo for High Accuracy Depth Maps", Computer Vision and Pattern Recognition, 2008. CVPR 2008. IEEE Conference on, Jun. 2008, pp. 1-8.

* cited by examiner

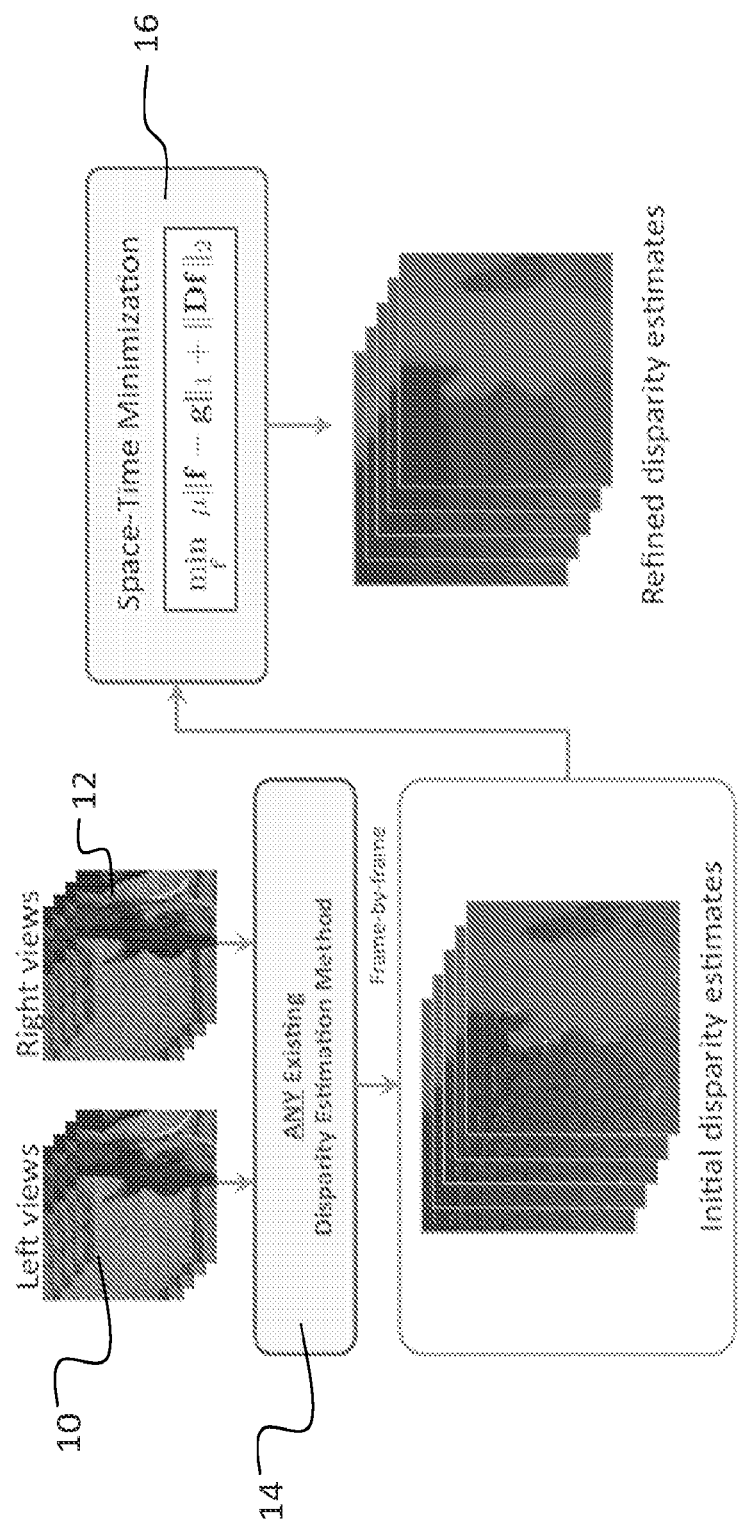

VIDEO DISPARITY ESTIMATE SPACE-TIME REFINEMENT METHOD AND CODEC

STATEMENT OF GOVERNMENT INTEREST

This invention was made with government support under grant no. CCF-1065305 awarded by the National Science Foundation. The government has certain rights in the invention.

FIELD

A field of the invention is video encoding and decoding. Example applications of the invention include the encoding, storage, transmission, decoding and stereo video data, including 3D video processing.

BACKGROUND

Disparity estimation is a necessary component in stereo video processing and 3D video processing. Video disparity is used for 3D video processing. In a two-camera imaging system, disparity is defined as the vector difference between the imaged object points in each image relative to the focal point. It is this disparity that allows for depth estimation of objects in the scene via triangulation of the point in each image. In rectified stereo, where both camera images are in the same plane, only horizontal disparity exists. In this case, multiview geometry shows that disparity is inversely proportional to actual depth in the scene.

Estimating disparity has been extensively studied for images. The existing image-based methods are ill-suited to video disparity estimation on a frame-by-frame basis because temporal consistency is not guaranteed. Using these methods for video disparity estimation often leads to poor spatial and temporal consistency. Temporal consistency is the smoothness of the disparity in time. If a video disparity is temporally consistent, then an observer will see flickering artifacts. Temporally inconsistent disparity degrades the performance of view synthesis and 3D video coding.

Existing disparity estimation methods are also tuned for specific datasets such as Middlebury stereo database. See, D. Scharstein and R. Szeliski, "A Taxonomy and Evaluation of Dense Two-Frame Stereo Correspondence Algorithms" International Journal of Computer Vision, vol 47, pp. 7-42 (April 2002). Such methods tend to perform poorly when applied to real video sequences. Many common real video sequences have lighting conditions, color distributions and object shapes that can be very different from the images on Middlebury stereo database. For methods that require training, applying such methods to real videos is almost impossible and at least is highly impractical from a perspective of speed of execution and complexity of computation.

Existing image-based disparity estimation techniques may be categorized into one of two groups: local or global methods. Local methods treat each pixel (or an aggregated region of pixels) in the reference image independently and seek to infer the optimal horizontal displacement to match it with the corresponding pixel/region. Global methods incorporate assumptions about depth discontinuities and estimate disparity values by minimizing an energy function over all pixels using techniques such as Graph Cuts or Hierarchical Belief Propagation. Y. Boykov et al, "Fast Approximate Energy Minimization via Graph Cuts," IEEE Transactions on Pattern Analysis and Machine Intelligence, vol. 23, no. 11, pp. 1222-1239 (February 2004); V. Kolmogorov and R. Zabih, "Computing Visual Correspondence with Occlusions via Graph Cuts," International Conference on Computer Vision Proceedings, pp. 508-515 (2001). Local methods tend to be very fast but global methods tend to be more accurate. Most implementations of global methods tend to be unacceptably slow. See, D. Scharstein and R. Szeliski, "A Taxonomy and Evaluation of Dense Two-Frame Stereo Correspondence Algorithms," International Journal of Computer Vision, vol. 47, pp. 7-42 (April 2002).

Attempts to solve stereo-matching problems for video have had limited success. Difficulties encountered have included the computational bottleneck of dealing with multidimensional data, lack of any real datasets with ground-truth, and the unclear relationship between optimal spatial and temporal processing for correspondence matching. Most have attempted to extend existing image-methods to video and have produced computational burdens that are impractical for most applications.

One attempt to extend the Hierarchical Belief Propagation method to video extends the matching cost representation to video by a 3-dimensional Markov Random Field (MRF). O. Williams, M. Isard, and J. MacCormick, "Estimating Disparity and Occlusions in Stereo Video Sequences," in Computer Vision and Pattern Recognition Proceedings (2005). Reported algorithmic run times were as high as 947.5 seconds for a single 320×240 frame on a powerful computer, which is highly impractical.

Other approaches have used motion flow fields to attempt to enforce temporal coherence. One motion flow field technique makes use of a motion vector field. F. Huguet and F. Devernay, "A Variational Method for Scene Flow Estimation from Stereo Sequences," in International Conference on Computer Vision Proceedings pp. 1-7 (2007). Another makes use of See, M. Bleyer and M. Gelautz, "Temporally Consistent Disparity Maps from Uncalibrated Stereo Videos," in Proceedings of the $6^{th}$ International Symposium on Image and Signal Processing (2009).

One computationally practical method is a graphics processing unit (GPU) implementation of Hierarchical Belief Propagation that relies upon locally adaptive support weights. See, C. Richardt et al, "Realtime Spatiotemporal Stereo Matching Using the Dual-Cross-Bilateral Grid," in European Conference on Computer Vision Proceedings (2010); K. J. Yoon and I. S. Kweon, "Locally Adaptive Support-Weight Approach for Visual Correspondence Search," in Computer Vision and Pattern Recognition Proceedings (2005). This method integrates temporal coherence in a similar way to Williams et al. (O. Williams, M. Isard, and J. MacCormick, "Estimating Disparity and Occlusions in Stereo Video Sequences," in Computer Vision and Pattern Recognition Proceedings (2005)) and also provides a synthetic dataset with ground-truth disparity maps. Other methods that are practical require specific hardware or place data constraints. See, J. Zhu et al, "Fusion of Time-of-Flight Depth and Stereo for High Accuracy Depth Maps," in Computer Vision and Pattern Recognition Proceedings (2008) pp. 1-8; G. Zhang, J. Jia, T. T. Wong, and H. Bao, "Consistent Depth Maps Recovery from a Video Sequence," PAMI, vol. 31, no. 6, pp. 974-988 (2009).

SUMMARY OF THE INVENTION

An embodiment of the invention is a method for disparity estimation of stereo video data receives a sequence of frames of stereo video data. Image-based disparity estimation is initially conducted on a frame-by-frame basis to produce initial disparity estimates. A plurality of initial disparity estimates is grouped into a space-time volume.

Disparity error is reduced in the space-time volume to refine the initial disparity estimates.

BRIEF DESCRIPTION OF THE DRAWING

FIG. 1 is a block diagram showing a preferred embodiment method for spatio-temporal error reduction of a disparity estimate.

DETAILED DESCRIPTION OF THE PREFERRED EMBODIMENTS

An embodiment of the invention is a method that can provide disparity estimation in real time. Left and right stereo views are received from a stereo sensor system or other stereo video source. The method conducts an initial image-based disparity estimation followed by a refinement to reduce error in the initial disparity estimation in a space-time volume. The spatio-temporal refinement of the invention can be used with any existing image disparity estimation technique. The method can be implemented as a post-processing step to refine noisy estimates or can be extended to videos. Testing shows superior speed, accuracy, and consistency compared to state-of-the-art algorithms. Testing shows resilience to high levels of noise.

Preferred methods of the invention leverage the strength of current state-of-the-art image-based techniques, but also explicitly enforce consistency of estimates in both space and time by treating the video as a space-time volume corrupted by noise. Methods of the invention have the capability of refining arbitrary image-based disparity estimation techniques and, at the same time, extending the utility of such techniques to the video domain.

A preferred embodiment codec of the invention can be implemented with standard graphics processors. A preferred method has be tested and demonstrated to be fast. The total variation minimization problem is non-differentiable, and so existing methods such as interior point methods are slow. Preferred methods of the invention apply a Douglas-Rachford splitting method to split the non-differentiable and differentiable parts of the minimization problem. Efficient techniques are applied to handle the non-differentiable and differentiable parts individually. Typical run time of the method on a 300×400 gray-scaled video is 2 seconds per frame on MATLAB/Windows, using an Intel Qual Core 2.8 GHz, 4GB DDR3 RAM PC. Software and system optimization will readily improve this time. Porting the method to C++ and GPU is expected to provide a 10 times speed improvement compared to the MATLAB version. Speed can be improved also by providing some pre-processing to correct light balance and rectify stereo video input date.

Advantageously, methods of the invention can be used as a refinement, or a post-processing method, Therefore, under the present framework, ANY existing image-based disparity estimation algorithm can be used to generate initial disparity estimates. The present algorithm is tested to be able to reduce the error for all 99 top-ranking image-based disparity estimation algorithms in Middlebury. In addition, the present algorithm does not require significant parameter tuning from video to video. Even by using the default settings, the algorithm is able to generate reasonable results for a wide range of videos.

Preferred methods of the invention provide video disparity estimation that addresses many 3D related video processing problems. Preferred methods can provide multiview synthesis, which requires accurate disparity maps for high quality multiview synthesis.

Preferred methods of the invention can also provide 3D object detection. Identifying that an object in a scene is located in a particular depth layer with method of the invention permits disparity to be accurately estimated so that objects in the video can be extracted easily, including identifying partially occluded objects more accurately.

Preferred methods also improved accuracy and efficiency in existing multiview coding (MVC) methods that encode the two stereo videos independently. Methods of the invention provide an accurate disparity map that permits encoding of only one view, e.g., the left view, the disparity and the residue. On the decoder side, a view synthesis algorithm can then be used to reconstruct the right view. This clearly permits bit rate to be reduced significantly using this approach because coding a disparity requires a much lower bit rate than an image.

Preferred methods can for that reason and for additional reasons can also improved 3D video transmission. Wireless transmission process, packets will be lost due to distortion in the channel. Methods of the invention can be used to impair corrupted disparity in the receiver end, because a corrupted disparity is less spatio-temporally consistent.

Preferred methods of the invention can also be used to detect salient objects. Accurate disparity measurement can identify salient objects that are typically in the foreground. With accurate disparity estimates, locating salient objects is easier. Also, preferred methods can correct video blur, which consists of both motion blur and out-of-focus blur. With accurate disparity estimates, it is possible to infer the depth layer and handle out-of-focus blur more efficiently.

Preferred embodiments of the invention will now be discussed with respect to the drawings. The drawings may include schematic representations, which will be understood by artisans in view of the general knowledge in the art and the description that follows. Features may be exaggerated in the drawings for emphasis, and features may not be to scale.

A preferred method of the invention will be discussed with respect to FIG. 1. The method can be implemented, for example, via computer code stored on a non-transient medium. It can be implemented in hardware or firmware, and as a codec, in various video capture and processing devices. Example devices include augmented reality systems, human computer interaction devices, and gaming or entertaining devices such as Microsoft Kinect. In the method of FIG. a stereo video (left sequence 10 and right sequence 12) is input to an image-based disparity estimation algorithm 14. Subsequent steps in the method are independent of the image-based disparity estimation 14, so the image-based disparity estimation can be any existing or yet to be developed image based disparity estimation method. The only requirement is that the image-based disparity estimation generates an initial disparity on a frame-by-frame basis.

In a preferred embodiment, a Hierarchical Belief Propagation (HBP) method is used for image-based disparity estimation 14. This rivals local methods in computational time while being more accurate. Let P be the set of pixels in an image and £ be a finite set of labels. The labels correspond to quantities that we want to estimate at each pixel (i.e., the disparity). A labeling $f$ assigns a label $f \epsilon £$ to each pixel p $\epsilon$P. As with traditional global methods, an energy function is designated for each pixel. The energy function indicates how well that label fits:

$$E(f) = \sum_{p \in P} D_p(f_p) + \sum_{(p,q) \in N} V(f_p - f_q) \qquad (1)$$

$D_p(f_p)$ is the data cost and $(f_p-f_q)$ is generally known in the art as the smoothness cost, however a more accurate characterization would be the discontinuity cost. Intuitively, the data cost captures how well the labeling fits the node (how well the disparity estimate matches the stereo information). The discontinuity cost enforces the assumption that labels should vary slowly almost everywhere except for drastic changes along object boundaries. Neighboring pixels in neighborhood N are penalized according to how large the difference is between their labels.

In a preferred embodiment of the invention, the data cost is computed over a large window for each pixel using Yoon and Kweon's locally adaptive support weights, so that only points with a high probability of belonging to the same object contribute significantly to the cost calculation. Yoon et al, "Locally Adaptive Support-Weight Approach for Visual Correspondence Search," in Computer Vision and Pattern Recognition (2005). The window, typically in the range of 8×8 to 64×64 is set to balance computational demands and capture appropriate information around a pixel being evaluated. The larger the window used, the more information captured from the pixels surrounding the central pixel being evaluated. At some point, however, increasing the window size does not add more power of discernment to the problem. For the discontinuity cost, a preferred method of the invention uses known truncated weighted linear:

$$V(f_p-f_q)=\min(\alpha|f_p-f_q|,\beta) \quad (2)$$

where $f_p$ and $f_q$ are the labels to be assigned to pixels p and q. The energy is minimized over the entire image in a coarse-to-fine manner. The technique in P. Felzenszwalb and D. Huttenlocher, "Efficient Belief Propagation for Early Vision," in Computer Vision and Pattern Recognition Proceedings pp. 261-268 (2004) is a suitable technique to minimize the energy. This technique iteratively passes messages from all pixels to their neighbors in parallel. The message vector represents the minimal energy labeling of each node (pixel) and all the information coming into it through the connected nodes. This current labeling, or belief, of each pixel is passed to its neighbors. After T iterations, information will have propagated across the image and the minimization will provide globally disparity labeling across the image that is optimal or approaches optimal.

To this point, disparity maps have been computed individually in a frame-by-frame basis. Disparity error is then reduced in a space-time volume 16. In the preferred embodiment, a space-time minimization 16 is applied to refine the image-based disparity estimation. This minimization 16 is based upon the recognition by the present inventors that disparity maps should generally be a piecewise smooth function in time, except for discontinuities at object borders (in which case the value will drastically change). This is valid for actual video because objects do not simply disappear from one frame to the next. However, this smoothness assumption is normally violated in most initial disparity maps that characterize video, as there are inevitable estimation errors.

In the space-time minimization 16, the initial disparity estimates are grouped to form a three-dimensional data, creating a space-time volume. The space-time volume includes a sequence of frames. The number of frames depends on the capacity of the computer memory available. More frames are generally better for the refinement. As an example, with 4GB RAM and frames sized at 300×400 pixels, 20 frames can be used. The space-time volume consists of three coordinates: (x,y) in space, and t in time. The problem can be defined as the minimization of two terms:

$$\min_f \mu \|f-g\|_1 + \|Df\|_2 \quad (3)$$

The term $\|f-g\|_1$ is a measurement of the residue between the optimization variable f and the input data g. The measurement can be accomplished using the vector one-norm, which is the absolute sum of the entries of a vector. The optimization variable refers to the quantity being changed in solving (3), which is f.

Since g is typically noisy, minimizing the residue $\|f-g\|_1$ is equivalent to finding a best fitting data f that preserve as much information in g as possible, while at the same time eliminate outliers in g. The second term $\|Df\|_2$ is the total variation regularization. It is used to regularize the solution f so that f is spatially and temporally smooth, while edges are preserved. Unlike conventional total variation, the total variation presented in the present method is implemented for a space-time volume. Specifically, the operator D consists of three forward-difference operators $D_x$, $D_y$, and $D_t$. With scaling parameters ($\beta_x$, $\beta_y$, $\beta_t$), the total variation norm of f is $$\|f\|_{TV} = \|Df\|_2$$

$$\|Df\|_2 \stackrel{def}{=} \sum_i \sqrt{\beta_x^2 |D_x f|_i^2 + \beta_y^2 |D_y f|_i^2 + \beta_t^2 |D_y f|_i^2}.$$

The scaling parameters ($\beta_x$, $\beta_y$, $\beta_t$) are pre-defined before running the optimization (3). These could be defined by users or set according to particular devices. If no user input is detected, betas can use a default setting, e.g. Defaults are $\beta_x=1$, $\beta_y=1$, $\beta_t=10$. These values can be determined and optimized experimentally for different typed of video and sensor devices. Directly solving equation 3 with $\|Df\|_2$ defined by the forward difference operators and the scaling parameters is difficult, because both terms in the problem are not-differentiable. The present method solves an equivalent constrained minimization problem $$\underset{f,u,r}{\text{minimize}}\, \mu \|r\|_1 + \|u\|_1$$

subject to $r = f - g$ and $u = Df$.

This constrained minimization problem can be solved determining the saddle point of the augmented Lagrangian function, defined as $$L(f,u,r,y,z) = \mu\|r\|_1 + \|\mu\|_1 - z^T(r-f+g) + \frac{\rho_o}{2}\|$$
$$r-f+g\|_2^2 - y^T(u-Df) + \frac{\rho_r}{2}\|u-Df\|_2^2$$

The augmented Lagrangian consists of five parts. The first part $\mu\|r\|_1 + \|u\|_1$ is the objective; the second part $-z^T(r-f+g)$ is the Lagrange multiplier for the equality constraint $r=f-g$; the third part $$\frac{\rho_o}{2}\|r-f+g\|_2^2$$

is a half-quadratic penalty, where $\rho_o$ is a parameter; the fourth part $-y^T(u-Df)$ is the Lagrange multiplier for the constraint $u=Df$; the fifth part $$\frac{\rho_r}{2}\|u-Df\|_2^2$$

is a half-quadratic penalty, where $\rho_r$ is a parameter. See, J. Eckstein and D. Bertsekas, "On the Douglas-Rachford Splitting Method and the Proximal Point Algorithm for Maximal Monotone Operators" Mathematical Programming 55:293-318 (1992).

The saddle point of the augmented Lagrangian function can be determined by solving a sequence of subproblems iteratively. Given the initial values $f^{(0)}=g$, $u^{(0)}=Df^{(0)}$, $y^{(0)}=0$, $r^{(0)}=f^{(0)}-g$, $z^{(0)}=0$, the iterative method solves $$f^{(k+1)} = F^{-1}\left\{\frac{F[\rho_o g + \rho_o(r^{(k)} - z^{(k)}) + D^T(\rho_r u^{(k)} - y^{(k)})]}{\rho_o + \rho_r[|F[D_x]|^2 + |F[D_y]|^2 + |F[D_t]|^2]}\right\}$$

$$v^{(k+1)} = \beta D f^{(k+1)} + \frac{y^{(k)}}{\rho_r}$$

$$u^{(k+1)} = \max\left\{|v^{(k+1)}| - \frac{1}{\rho_r}, 0\right\}\text{sign}(v^{(k+1)})$$

$$r^{(k+1)} = \max\left\{\left|f^{(k+1)} - g + \frac{z^{(k)}}{\rho_o}\right| - \frac{\mu}{\rho_o}, 0\right\}\text{sign}\left(f^{(k+1)} - g + \frac{z^{(k)}}{\rho_o}\right)$$

$$y^{(k+1)} = y^{(k)} - \rho_r(u^{(k+1)} - Df^{(k+1)})$$

$$z^{(k+1)} = z^{(k)} - \rho_o(r^{(k+1)} - f^{(k+1)} + g)$$

The complexity of the present method is in the order of $n\log n$, where n is the number of variables in the space-time volume. This number is the number of operations required for a three-dimensional Fourier Transform for calculating $f^{(k+1)}$. Other operations in the present algorithm are inexpensive, compared to the Fourier Transform For example, in calculating $u^{(k+1)}$, only the elementwise maximum operator and the sign operator are needed.

A specific solution to Eq. (3) can be considered as follows, with the particular image-based disparity map initial step described above. Devine f as the unknown disparity map (vectorized version of $f(x,y,t)$), and g is the disparity map from the image-based disparity method. $D=|\beta_x D_x^T, \beta_y D_y^T, \beta_t D_t^T|^T$ represents the forward difference operators along the horizontal, vertical and temporal directions. The parameters $(\beta_x, \beta_y, \beta_t)$ control relative emphasis being put on the spatial and temporal terms. Generally, if the video has a lot of temporal noise then $\beta_t$ should be larger than $\beta_x$ and $\beta_y$. On the other hand, if the video has little temporal noise, then $\beta_t$ should be small because excessive amount of $\beta_t$ would oversmooth the resultant video. Inadequate $\beta_t$ would not denoise the video. As starting point that can be adjusted, $\beta_x$ and $\beta_y$ are typically fixed as 1, and for heavily noised video, $\beta_t=10$ is an appropriate defauly stting.

An $l_1$-norm is chosen for the objective function, $f-g$ because the target solution $f$ is ideally piecewise smooth. The regularization term $\|Df\|_2$ is the total variation-norm on $f$ ($\|f\|\_TV$). Eq. (3) can then be solved as described above with the intermediate variables $r=f-g$ and $=Df$, continuing to transform the unconstrained problem into an equivalent constrained minimization problem. Then an augmented Lagrangian method is used to handle the constraints, and an alternating direction method (ADM) can be used to solve the sub-problems iteratively. Details for this technique can be found in S. H. Chan, et al., "An Augmented Lagrangian Method for Total Variation Video Restoration," in IEEE International Conference on Acoustics, Speech, and Signal Processing, (May 2011).

Artisans will appreciate that the invention provides disparity maps as a space-time volume, instead of individual frames. This enables methods of the invention to simultaneously handle both spatial and temporal consistency, by tuning the parameters $(\beta_y, \beta_y, \beta_t)$. Also, unlike most existing methods that try to enhance temporal consistency by heuristic means, the present method is guaranteed to find the global minimum of Eq. (3) because it is convex, Methods of the invention have also been demonstrated to operate quickly. Typical run time for a 300×400 resolution sequence is approximately 2 seconds per frame on MATLAB/Windows, which implies the real-time processing capability with a compiled language.

Qualitative results on video sequences showed that a preferred method of the invention with the IMP image-based pre-processing reduced spatial noise and temporal inconsistencies. The method was also tested on synthetic video sequences, and qualitative measurements shows good performance compared to state of the art techniques. The method is HBP-TV in the table below:

TABLE 1

Comparison of methods with noise ~N (0.20). Average percent of bad pixels (threshold of 1) for all frames.

| Technique | Book | Street | Tanks | Template | Tunnel |
|---|---|---|---|---|---|
| HBP-TV | 26.97 | 17.69 | 26.50 | 18.01 | 29.50 |
| TDCB | 38.95 | 24.17 | 29.34 | 29.89 | 33.01 |
| DCB | 47.24 | 30.91 | 33.56 | 37.59 | 24.04 |
| DCB2 | 53.92 | 38.02 | 45.67 | 40.97 | 31.19 |

The present method is compared to different methods in Richardt et al., on the same synthetic video sequences used in C. Richardt et al, "Realtime Spatiotemporal Stereo Matching Using the Dual-Cross-Bilateral Grid," in European Conference on. Computer Vision Proceedings (2010). Improved results were also shown over a wide range of noise levels, with the present method in most all instances producing better results.

The method of the invention was also tested with different initial image-based disparity methods. The post-processing of the invention improves performance as indicated in Table 2 (where the pre-processing of C. Richardt et al were used):

TABLE 2

Versatility of TV for the various disparity methods. Average percent of bad pixels (threshold of 1) for all frames.

| Technique | Book | Street | Tanks | Temple | Tunnel |
|---|---|---|---|---|---|
| TDCB-TV | 27.10 | 17.45 | 23.25 | 21.94 | 32.21 |
| TDCB | 38.95 | 24.17 | 29.34 | 29.89 | 33.01 |
| DCB-TV | 35.31 | 22.45 | 23.00 | 27.38 | 22.41 |
| DCB | 47.24 | 30.91 | 33.56 | 37.59 | 24.04 |
| DCB2-TV | 48.66 | 31.91 | 41.28 | 32.14 | 30.43 |
| DCB2 | 53.92 | 38.02 | 45.67 | 40.97 | 31.19 |

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A method for disparity estimation of stereo video data, comprising:
   receiving a sequence of frames of stereo video data;
   initially conducting image-based disparity estimation on a frame-by-frame basis to produce initial disparity estimates;
   grouping the initial disparity estimates into a space-time volume while minimizing space-time total variation of the initial disparity estimates to improve e space-time consistency; and
   reducing error in disparity in the space-time volume to refine the initial disparity estimates, wherein said reducing error comprises the minimization of two terms $\|f-g\|_1$ and $\|Df\|_2$:

$$\min_f \mu \|f - g\|_1 + \|Df\|_2$$

where $\|f-g\|_1$ is a measurement of a residue between an optimization variable f and input data g, $\|DF\|_2$ is a total variation regularization, and $\mu$ is a numerical value that balances weighting of $\|f-g\|_1$ and $\|Df\|_2$.

2. The method of claim 1, wherein said reducing error produces a solution and comprises minimizing error in the initial disparity estimates in the space-time volume while smoothing the solution and preserving edges.

3. The method of claim 2, wherein the initial disparity estimates are produced via Hierarchical Belief Propagation.

4. The method of claim 1, wherein said initially conducting comprises Hierarchical Belief Propagation.

5. The method of claim 1, wherein said initially conducting comprises Hierarchical Belief Propagation.

6. The method of claim 5, wherein said initially conducting assigns a label $f \in \mathcal{L}$ to each pixel $p \in P$ and determines an energy function for each pixel to determined how well the label fits according to:

$$E(f) = \sum_{p \in P} D_p(f_p) + \sum_{(p,q) \in N} V(f_p - f_q) \quad (1)$$

where $D_p(f_p)$ is the data cost and $V(f_p - f_q)$ is the smoothness cost, and N is a neighborhood of pixels.

7. The method of claim 6, wherein said reducing error comprises the minimization of two terms $\|f-g\|_1$ and $\|Df\|_2$:

$$\min_f \mu \|f - g\|_1 + \|Df\|_2$$

where $\|f-g\|_1$ is a measurement of a residue of fidelity, g is the initial disparity estimates (in space-time volume), and f is an optimization variable, and $\mu$ is a numerical value that balances weighting of $\|f-g\|_1$ and $\|Df\|_2$.

8. The method of claim 1, implemented by computer code stored on a non-transient medium.

9. The method of claim 8, implemented by a video codec.

10. A method for disparity estimation of stereo video data, comprising:
    receiving a sequence of frames of stereo video data;
    initially conducting image-based disparity estimation on a frame-by-frame basis to produce initial disparity estimates;
    grouping the initial disparity estimates into a space-time volume while minimizing space-time total variation of the initial disparity estimates to improve space-time consistency; and
    reducing error in disparity in the space-time volume to refine the initial disparity estimates, wherein said reducing error comprises minimizing $\|f-g\|_1$ and $\|Df\|_2$ over a variable f:

$$\min_f \mu \|f - g\|_1 + \|Df\|_2$$

where $\|Df\|_2$ is defined as:

$$= \sqrt{\beta_x^2 \|D_x f\|^2 + \beta_y^2 \|D_y f\|^2 + \beta_t^2 \|D_t f\|^2}$$

$D_x$, $D_y$, and $D_t$ are forward difference operators and ($\beta_x$, $\beta_y$, $\beta_t$) are scaling parameters; and wherein $\|f-g\|_1$ is a measurement of a residue between an optimization variable f and input data g, $\|Df\|_2$ is a total variation regularization, and $\mu$ is a numerical value that balances weighting of $\|f-g\|_1$ and $\|Df\|_2$.

11. The method of claim 10, wherein said minimizing comprises solving an equivalent constrained minimization problem.

12. The method of claim 11, wherein the equivalent constrained minimization problem is solved by determining the saddle point of an augmented Lagrangian function.

13. The method of claim 12, wherein the initial disparity estimates are produced via Hierarchical Belief Propagation.

* * * * *